US005164001A

United States Patent [19]

Saito et al.

[11] Patent Number: 5,164,001

[45] Date of Patent: Nov. 17, 1992

[54] METHOD FOR PREPARING AQUEOUS DISPERSION OF DEVELOPER AND PRESSURE-SENSITIVE RECORDING PAPER

[75] Inventors: Toranosuke Saito; Shigeru Oda, both of Osaka; Tomoharu Shiozaki; Masato Tanaka, both of Hyogo, all of Japan

[73] Assignees: Sanko Kaihatsu Kagaku Kenkyusho, Osaka; Kanzaki Paper Manufacturing Co., Ltd., Tokyo, both of Japan

[21] Appl. No.: 616,788

[22] Filed: Nov. 21, 1990

[30] Foreign Application Priority Data

Nov. 22, 1989 [JP] Japan ................................ 1-301820
Mar. 30, 1990 [JP] Japan ................................ 2-81239

[51] Int. Cl.[5] ........................ C09D 11/00; G03C 5/30
[52] U.S. Cl. ................................ 106/21 R; 503/216
[58] Field of Search ........................ 106/21; 503/216

[56] References Cited

U.S. PATENT DOCUMENTS

| | | | |
|---|---|---|---|
| 4,046,941 | 9/1977 | Saito et al. | 503/210 |
| 4,087,284 | 5/1978 | Golden et al. | 106/21 |
| 4,115,327 | 9/1978 | Kikuga et al. | 503/225 |
| 4,134,847 | 1/1979 | Oda et al. | 427/150 |
| 4,234,212 | 11/1980 | Kato et al. | 106/21 |
| 4,374,671 | 2/1983 | Hayashi et al. | 106/21 |
| 4,950,330 | 8/1990 | Saito et al. | 106/21 |

FOREIGN PATENT DOCUMENTS

| | | |
|---|---|---|
| 0275107 | 7/1988 | European Pat. Off. . |
| 0283924 | 9/1988 | European Pat. Off. . |
| 0318941 | 6/1989 | European Pat. Off. . |
| 54-109447 | 8/1979 | Japan . |

*Primary Examiner*—William R. Dixon, Jr.
*Assistant Examiner*—Helene Klemanski
*Attorney, Agent, or Firm*—Kane, Dalsimer, Sullivan, Kurucz, Levy, Eisele and Richard

[57] ABSTRACT

Herein disclosed are a method for preparing an aqueous developer dispersion which comprises the steps of dissolving, in an organic solvent, a developer which comprises a nuclear-substituted salicylic acid salt represented by the following general formula (I):

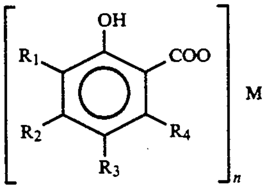

(I)

wherein $R_1$, $R_2$, $R_3$ and $R_4$ may be the same or different and each represents a hydrogen atom, a halogen atom, an alkyl group having not more than 15 carbon atoms, a cycloalkyl group, a phenyl group, a nuclear-substituted phenyl group, an aralkyl group or a nuclear-substituted aralkyl group, or two adjacent groups selected from $R_1$ to $R_4$ may be bonded together to form a ring; n is an integer of not less than 1; and M represents magnesium, calcium, zinc, aluminum, iron, cobalt, nickel or a basic ion thereof; emulsifying and dispersing the resulting solution in an aqueous solution of an acrylamide copolymer having a degree of polymerization of not less than 100 obtained by copolymerizing 96 to 70 mol % of acrylamide with 4 to 30 mol % of an alkyl or alkoxyalkyl, having not more than 4 carbon atoms, ester of acrylic acid, methacrylic acid, itaconic acid or maleic acid; then heating the emulsified dispersion to remove the organic solvent by distillation; and optionally finely wet-pulverizing the resulting aqueous dispersion to an extent that reduction in the average particle size of the developer dispersed in the dispersion does not exceed 10%. The recording paper is substantially improved in the developing density, developing velocity and printability.

10 Claims, No Drawings

METHOD FOR PREPARING AQUEOUS DISPERSION OF DEVELOPER AND PRESSURE-SENSITIVE RECORDING PAPER

BACKGROUND OF THE INVENTION

1. Field of the Invention

The present invention relates to a method for preparing an aqueous dispersion of a developer and, in particular, to a method for preparing an aqueous dispersion of a developer which can provide recording paper substantially improved in the color developing density and color developing velocity of recorded images, and printability of the developing surface thereof; as well as a pressure-sensitive recording paper obtained by the use of a coating composition containing the aqueous dispersion of a developer.

2. Description of the Prior Art

Active clay has been called inorganic developer, while phenol resins of novolak type and metal salts of nuclear-substituted salicylic acid have been called organic developers and have widely been employed for making pressure-sensitive recording paper (see, for instance, Japanese Patent Publication for Opposition Purpose (hereinafter referred to as "J.P. KOKOKU") Nos. Sho 42-20144 and Sho 51-25174). Any organic developer of this type is finely divided or finely dispersed in a medium which is commonly water, mixed with an inorganic filler, an adhesive or the like and then applied onto the surface of a substrate such as paper (see, for instance, J.P. KOKOKU No. Sho 48-16341 and Japanese Patent Unexamined Publication (hereinafter referred to as "J.P. KOKAI") No. Sho 54-143322).

Incidentally, the metal salts of nuclear-substituted salicylic acids used as developers for pressure-sensitive recording paper (hereunder simply referred to as "developer(s)") are in general an amorphous solid having a specific softening point and is applied onto the surface of paper after dispersing in water. Therefore, it is quite desirable that developers be provided in the form of a water dispersion in which the developer has a desired particle size and which is thick and excellent in handling properties and safety.

However, when coarse particles of a developer is directly pulverized into fine grains in water containing a dispersing agent or the like with a ball mill or a sand grinder (sand mill), it is very difficult to obtain fine particles of a developer and the resulting dispersion becomes highly thixotpropic and has low fluidability which in turn makes the handling thereof difficult. On the other hand, an emulsified dispersion having good fluidability even at a high concentration can be obtained by adding an organic solvent or a plasticizer to a developer to form a liquid product and then emulsified and dispersed in water containing a dispersing agent with a strong dispersing means. However, the dispersed particles comprise, in this case, liquid drops containing an organic solvent or a plasticizer, therefore, the particles grow into large particles and the particles agglomerate in the vicinity of the wall of a container and deposit onto the wall during storage over a long time period. Thus, an emulsion having sufficient stability cannot be obtained.

Some solutions for these problems have been proposed in particular in J.F. KOKAI No. Sho 63-173680 or Sho 64-34782 which discloses a method for preparing an aqueous dispersion of a developer containing emulsion particles having a desired particle size, having good fluidability even at a high concentration and good in storage stability. The method comprises dissolving a developer in an organic solvent, emulsifying and dispersing the resulting organic solution in an aqueous solution containing a dispersing agent and then heating the resulting dispersion to distill off and remove the organic solvent.

In this way, to heat a dispersion per se for removing the organic solvent is desirable from the viewpoint of desired uses of the developers and the stability of the resulting dispersion, but strictly speaking, these proposed methods suffer from some problems.

More specifically, stable dispersed state of the emulsified dispersion of a developer containing an organic solvent must be held at a high temperature for a long time period for completely distilling off and removing the organic solvent from the dispersion per se. For this reason, the dispersion must be a system which is an excellent protective colloid. However, such an excellent protective colloid system is in general highly foamable and correspondingly the space in a distillation vessel is occupied by stable foams during the distillation of the organic solvent which prevents rapid removal of the organic solvent and in a worst case, the operation for removing it would often be interrupted. On the other hand, if a dispersion system having low foaming properties is selected, the system is in general a poor protective colloid, a part of the dispersion is broken during the operation for removing the organic solvent, in turn excessively large aggregates of a developer are formed and thus the resulting dispersion is often practically unacceptable.

These two tendencies reciprocal to one another become more conspicuous, as the size of the distillation vessel increases, the desired particle size of the developer is small, an external force such as the strength of stirring is high and the concentration of the developer is high. This is a major obstacle in production of stable aqueous dispersions of this kind in an industrial scale.

SUMMARY OF THE INVENTION

Accordingly, an object of the present invention is to provide a method for preparing an aqueous dispersion of a developer which can provide recording paper improved in the color developing density and color developing velocity of recorded images.

Another object of the present invention is to provide a method for preparing an aqueous dispersion of a developer which can provide recording paper substantially improved in printability of the developing surface thereof.

A further object of the present invention is to provide pressure-sensitive recording paper obtained using a coating composition containing the aqueous dispersion of the developer.

The aforementioned objects can effectively be achieved by providing, according to an aspect of the present invention, a method for preparing an aqueous dispersion of a developer which comprises dissolving a developer composition comprising a nuclear-substituted salicylic acid salt represented by the following general formula (I):

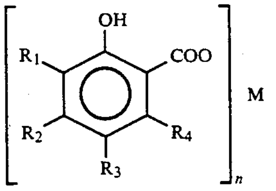

(I)

(wherein $R_1$, $R_2$, $R_3$ and $R_4$ may be the same or different and each represents a hydrogen atom, a halogen atom, an alkyl group having not more than 15 carbon atoms, a cycloalkyl group, a nuclear-substituted or unsubstituted phenyl group, or a nuclear-substituted or unsubstituted aralkyl group with the proviso that two adjacent groups selected from $R_1$, $R_2$, $R_3$ and $R_4$ may be bonded together to form a ring; n is an integer of not less than 1; and M represents magnesium, calcium, zinc, aluminum, iron, cobalt, nickel or a basic ion thereof); emulsifying and dispersing the resulting organic solution in an aqueous solution containing an acrylamide copolymer whose degree of polymerization is not less than 100 and which is obtained by copolymerizing 96 to 70 mole % of acrylamide and 4 to 30 mole % of an alkyl or alkoxyalkyl, having not more than 4 carbon atoms, ester of acrylic acid, methacrylic acid, itaconic acid or maleic acid; and then heating the resulting emulsified dispersion to remove the organic solvent by distillation.

According to another aspect of the present invention, there is provided a method for preparing an aqueous dispersion of a developer which comprises dissolving a developer composition comprising a nuclear-substituted salicylic acid salt represented by the following general formula (I):

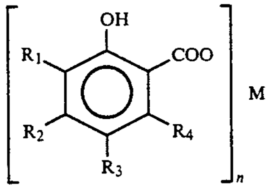

(I)

(wherein $R_1$, $R_2$, $R_3$ and $R_4$ may be the same or different and each represents a hydrogen atom, a halogen atom, an alkyl group having not more than 15 carbon atoms, a cycloalkyl group, a substituted or unsubstituted phenyl group, or a substituted or unsubstituted aralkyl group with the proviso that two adjacent groups selected from $R_1$, $R_2$, $R_3$ and $R_4$ may be bonded to form a ring; n is an integer of not less than 1; and M represents magnesium, calcium, zinc, aluminum, iron, cobalt, nickel or a basic ion thereof); emulsifying and dispersing the resulting organic solution in an aqueous solution containing an acrylamide copolymer whose degree of polymerization is not less than 100 and which comprises 96 to 70 mole % of acrylamide and 4 to 30 mole % of an alkyl or alkoxyalkyl, having not more than 4 carbon atoms, ester of acrylic acid, methacrylic acid, itaconic acid or maleic acid; then heating the resulting emulsified dispersion to remove the organic solvent by distillation; and subjecting the resulting aqueous dispersion to a wet pulverization treatment so that the rate of reduction in the average particle size of the developer dispersed therein is not more than 10%.

DESCRIPTION OF THE PREFERRED EMBODIMENTS

The problems encountered when an organic solvent is completely removed from an emulsified dispersion containing the same have already been discussed above, but these problems can desirably be solved if a dispersion system which is a good protective colloid system and has very low foaming properties is developed.

In this respect, it has been found out that the acrylamide copolymer having a specific composition has high protective action in a colloidal system and can provide a dispersion system having low foaming properties and thus the foregoing problems can be eliminated. More specifically, it is confirmed that a dispersion system which is a good protective colloid system and has low foaming properties can be obtained when a specific acrylamide copolymer is employed, the degree of polymerization thereof being not less than 100 and the acrylamide copolymer being obtained by copolymerizing 96 to 70 mole % of acrylamide and 4 to 30 mole % of an alkyl or alkoxyalkyl, having not more than 4 carbon atoms, ester of acrylic acid, methacrylic acid, itaconic acid or maleic acid.

Specific examples of the alkyl or alkoxyalkyl, having not more than 4 carbon atoms, esters of acrylic acid, methacrylic acid, itaconic acid or maleic acid include methyl acrylate, ethyl acrylate, propyl acrylate, isopropyl acrylate, butyl acrylate, isobutyl acrylate, sec-butyl acrylate, 2-methoxyetyl acrylate, 2-ethoxyethyl acrylate, methyl methacrylate, ethyl methacrylate, propyl methacrylate, isopropyl methacrylate, butyl methacrylate, isobutyl methacrylate, tert-butyl methacrylate, 2-ethoxyethyl methacrylate, dimethyl itaconate, diethyl itaconate, dimethyl maleate, diethyl maleate or diisopropyl maleate. All these monomers are highly copolymerizable with acrylamide.

Acrylamide can be copolymerized with an alkyl or alkoxyalkyl, having not less than 5 carbon atoms, ester of acrylic acid, methacrylic acid, itaconic acid or maleic acid such as amyl acrylate, hexyl acrylate, octyl acrylate, 2-ethylhexyl acrylate, isononyl acrylate, decyl acrylate, isodecyl acrylate, lauryl acrylate, isododecyl acrylate, isotridecyl acrylate, 2-butoxyethyl acrylate, 2-isobutoxyethyl acrylate, amyl methacrylate, 2-ethylhexyl methacrylate, lauryl methacrylate, 2-butoxyethyl methacrylate, dihexyl itaconate, dihexyl maleate or di-2-ethylhexyl maleate, but these monomers are beyond the scope of this invention. This is because, acrylamide copolymers obtained by copolymerizing a large amount of these esters have high protective action, but in general have high foaming properties. Further, if the degree of copolymerization and/or the content of these esters are reduced to minimize the foaming properties of the resulting copolymer, the protective action thereof is greatly impaired. Thus, the objects of the present invention cannot be attained by the use of these acrylamide copolymers. However, a small amount of these esters may be incorporated into the acrylamide copolymers used in the present invention as an optional component thereof so far as they do not adversely affect the intended effects of the present invention. In this case, the foregoing monomer ratio should be slightly changed in proportion to the amount of these esters used.

The acrylamide copolymers used in the present invention may further comprise other monomers copolymerizable with acrylamide so far as the intended effects of the present invention are not adversely affected.

Specific examples of such monomers are acrylonitrile, acrylic acid, 2-hydroxyethyl acrylate, cyclohexyl acrylate, benzyl acrylate, 2-phenoxyethyl acrylate, 2-dimethylaminoethyl acrylate, tetrahydrofurfuryl acrylate, sodium acrylate, ethylene glycol diacrylate, 1,4-butanediol diacrylate, neopentyl glycol diacrylate, methacrylic acid, 2-hydroxyethyl methacrylate, 2-dimethylaminoethyl methacrylate, tetrahydrofurfuryl methacrylate, sodium methacrylate, ethylene glycol dimethacrylate, itaconic acid, sodium itaconate, N-phenylmaleimide or vinyl pyridine.

The correlation between the protective action and the foaming properties of the acrylamide copolymer is further affected by the degree of copolymerization and the monomer ratio of repeating units constituting the copolymer. The polymers having very low degree of copolymerization exhibit very low protective action and, therefore, the degree of copolymerization of the acrylamide copolymer should be at least 100, preferably at least 200 to achieve the intended effects of the prsent invention. On the other hand, the upper limit of the degree of copolymerization is not critical, but if it exceeds 10,000, the viscosity of the aqueous solution of the resulting polymer becomes extremely high, hence the increase in the protective action thereof is not so conspicuous, but the foaming properties thereof are greatly increased. Thus, it is assumed that preferred degree of copolymerization is not more than 5,000, preferably not more than 3,000.

The correlation between the monomer ratio and the characteristics of the copolymer also depends on the kinds of the ester copolymerized with acrylamide and can be well appreciated as a balance between hydrophilicity and hydrophobicity judging from that the copolymer is considered to be a surfactant. In this case, acrylamide is considered to be a hydrophilic component and an ester a hydrophobic component. The extent of the hydrophobicity can be evaluated on the basis of the number of carbon atoms of the alkyl or alkoxyalkyl group constituting each ester. The higher the ester monomer ratio of the copolymer, the higher the hydrophobicity of the copolymer and the lower the solubility thereof in water. The monomer ratio favorable for the purpose of the present invention varies depending on the kinds of the esters used. Correspondingly, if only esters having low hydrophobicity are employed, a relatively high monomer ratio is preferred while if those having high hydrophobicity are employed, a relatively low monomer ratio is preferably selected. For instance, methyl acrylate having the lowest number of carbon atoms has the lowest hydrophobicity and the acrylamide copolymer preferably comprises 85 to 70 mole % of acrylamide and 15 to 30 mole % of methyl acrylate. And if butyl acrylate having relatively high lipophobicity is employed, the acrylamide copolymer preferably comprises 96 to 85 mole % of acrylamide and 4 to 15 mole % of butyl acrylate. Moreover, when ethyl acrylate having an intermediate hydrophobicity is used, the copolymer preferably comprises 92 to 75 mole % of acrylamide and 8 to 25 mole % of ethyl acrylate. Multi-component copolymers obtained by copolymerizing a plurality of esters with acrylamide may also be employed in the present invention. In such a case, the monomer ratio of the acrylamide copolymer can be determined if it is assumed that the hydrophobic component is composed of a plurality of esters. For instance, when ethyl acrylate and butyl acrylate are simultaneously used as the hydrophobic components, the acrylamide copolymer preferably comprises 95 to 77 mole % of acrylamide, 3 to 22 mole % of ethyl acrylate and 1 to 14 mole % of butyl acrylate.

Some of the methods for preparing the acrylamide copolymer of this type are detailed in, for instance, J.P. KOKAI No. Sho 62-241549. Most preferably, the polymerization reaction is performed in a medium mainly comprising water under the conditions at which a uniform reaction takes place from the viewpoint of smoothness of the polymerization reaction, uniformity of the composition of the resulting polymer and easiness of control of the degree of polymerization. Acrylamide is soluble in water, but the alkyl or alkoxyalkyl, having not more than 4 carbon atoms, ester of acrylic acid, methacrylic acid, itaconic acid or maleic acid are not soluble in water in a sufficient amount required for fulfilling the monomer ratio defined above. Thus, the polymerization reaction is preferably performed in a solvent comprising water and a small amount of a water-soluble organic solvent in order to uniformly dissolve these monomers and to hence perform the overall polymerization reaction.

Examples of such water-soluble organic solvents include methanol, ethanol, isopropanol, secondary butanol, tertiary butanol, ethylene glycol monomethyl ether, ethylene glycol monoethyl ether, 3-methoxybutanol, tetrahydrofuran, dioxane, dimethylformamide, dimethylacetamide, acetonitrile, dimethylsulfoxide, acetone or methyl ethyl ketone. The solution finally obtained after the copolymerization as such can be used for preparing the dispersion of the present invention, but the organic solvent is preferably removed from the solution.

The degree of polymerization of the copolymers is relatively easily be controlled. Among the foregoing water-soluble organic solvents, only isopropanol and secondary butanol have very high chain-transfer coefficients and have ability of controlling the degree of copolymerization. Other agents for controlling the degree of copolymerization may of course be employed. However, in the present invention, a mixture of acrylamide and esters in a desired monomer ratio is dissolved in a mixed solvent containing water and isopropanol or secondary butanol in an amount required for achieving a desired degree of copolymerization, then a polymerization initiator is added to the solution and the polymerization is thus initiated if the monomer mixture is sufficiently soluble in the mixed solvent. On the other hand, if monomer mixture is not sufficiently soluble and the solution is not uniform, an additional amount of a water-soluble organic solvent having a relatively low chain-transfer coefficient is added thereto till the solution becomes uniform and then the polymerization is initiated. Any polymerization initiators and conditions for the polymerization well-known in the art may arbitrarily be selected. All the acrylamide copolymers having a monomer ratio specified above are prepared according to the method discussed above.

The nuclear-substituted salicylic acid salts represented by the foregoing general formula (I) show high developing ability are effectively used for preparing pressure-sensitive recording paper and typical examples thereof are polyvalent metal salts of acids such as 3-methyl-5-(iso)nonyl salicylic acid, 3-methyl-5-(iso)-dodecyl salicylic acid, 3-methyl-5-(iso)pentadecyl salicylic acid, 3-methyl-5-(α-methylbenzyl)salicylic acid, 3-methyl-5-(α,α-dimethylbenzyl)salicylic acid, 3,5-di-sec-butyl salicylic acid, 3,5-di-tert-butyl-6-methyl salicylic acid, 3-tert-butyl-5-phenyl salicylic acid, 3,5-di-tert-amyl salicylic acid, 3-cyclohexyl-5-(iso)nonyl salicylic acid, 3-phenyl-5-(iso)nonyl salicylic acid, 3-(α-methylbenzyl)-5-(iso)nonyl salicylic acid, 3-isopropyl-5-(iso)nonyl salicylic acid, 5-(iso)nonyl salicylic acid, 3-(iso)nonyl salicylic acid, 3-(iso)nonyl-5-methyl salicylic acid, 3-(iso)nonyl-5-cyclohexyl salicylic acid, 3-(iso)nonyl-5-phenyl salicylic acid, 3-(iso)nonyl-5-(α-methylbenzyl) salicylic acid, 3-(iso)nonyl-5-(4,α-dimethylbenzyl) salicylic acid, 3-(iso) nonyl-5-(α,α-dimethylbenzyl) salicylic acid, 3-(α,α-dimethylbenzyl)-5-(iso)nonyl salicylic acid, 3-tert-butyl-5-(iso)nonyl salicylic acid, 3,5-di(iso)nonyl salicylic acid, 3-(iso)nonyl-6-methyl salicylic acid, 3-(iso)dodecyl salicylic acid, 3-(iso)dodecyl-5-methyl salicylic acid, 3-(iso)dodecyl-6-methyl salicylic acid, 3-isopropyl-5-(iso) dodecyl salicylic acid, 3-(iso)dodecyl-5-ethyl salicylic acid, 5-(iso)-dodecyl salicylic acid, 3-(iso)pentadecyl salicylic acid, 3-(iso)pentadecyl-5-methyl salicylic acid, 3-(iso)pentadecyl-6-methyl salicylic acid, 5-(iso)pentadecyl salicylic acid, 3,5-dicyclohexyl salicylic acid, 3-cyclohexyl-5-(α-methylbenzyl) salicylic acid, 3-phenyl-5-(α-methylbenzyl) salicylic acid, 3-phenyl-5-(α,α-dimethylbenzyl) salicylic acid, 3-(α-methylbenzyl) salicylic acid, 3-(α-methylbenzyl)-5-methyl salicylic acid, 3-(α-methylbenzyl)-6-methyl salicylic acid, 3-(α-methylbenzyl)-5-phenyl salicylic acid, 3,5-di-(α-methylbenzyl) salicylic acid, 3-(α-methylbenzyl)-5-(α,α-dimethylbenzyl) salicylic acid, 3-(α-methylbenzyl)-5-bromosalicylic acid, 3-(α,4-dimethylbenzyl)-5-methyl salicylic acid, 3,5-di-(α,4-dimethylbenzyl) salicylic acid, 3-(α,α-dimethylbenzyl)-5-methyl salicylic acid, 3-(α,α-dimethylbenzyl)-6-methyl salicylic acid, 3,5-di-(α,α-dimethylbenzyl) salicylic acid, 5-(4-mesitylmethylbenzyl) salicylic acid, benzylated-styryrated salicylic acid, 2-hydroxy-3-(α,α-dimethylbenzyl)-1-naphthoic acid or 3-hydroxy-7-(α,α-dimethylbenzyl)-2-naphthoic acid. Specific examples of the polyvalent metals are magnesium, calcium, zinc, aluminum, iron, cobalt and nickel, which may be in the form of basic ions.

These nuclear-substituted salicylic acid salts may be used alone or in any combination as the developers in the invention. In the foregoing exemplified compounds, the term "(iso)alkyl" herein means an isoalkyl or normal alkyl. In addition, the terms "isononyl group", "isododecyl group" and "isopentadecyl group" are defined to be substituents obtained through the addition of a propylene trimer; propylene tetramer or 1-butene trimer; and propylene pentamer, respectively. Moreover, these nuclear-substituted salicylic acid salts may be used in combination with a plasticizer, an ultraviolet absorber, an antioxidant, a photostabilizer and/or a resinous polymeric compound for further enhancement of the characteristic properties of the developer.

All of the developer compositions mainly comprising the foregoing nuclear-substituted salicylic acid salt are highly soluble in an organic solvent. Organic solvents are employed for the purpose of lowering the viscosity of the developer and of easily emulsifying and dispersing the same. The organic solvents to be used for such purposes are those which are relatively hardly dissolved in water, which have a low boiling point and which do not cause any chemical change or do not exert any influence on the developer during the preparation of the developer. Examples of such organic solvents are benzene, toluene, xylene, cyclohexane, methylcyclohexane, chloroform, carbon tetrachloride, trichloroethane, chlorobenzene, methyl ethyl ketone, methyl isobutyl ketone, ethyl acetate, butyl acetate, butanol, amyl alcohol, methyl tert-butyl ether or diisopropyl ether.

The mixing ratio of the developer to the organic solvent is properly selected depending on the particle size of the desired developer particles dispersed in an aqueous solution. More specifically, the amount of the organic solvent used is adjusted to a large amount if the particle size of the desired developer particles is very small, while it is adjusted to a small amount if the the particle size of the desired particles is great. The preferred amount of the organic solvent to be used ranges from 20 to 500 parts by weight per 100 parts by weight of the developer.

The softening point of the developer determined in its dried state differs from that determined in the state having an equilibrium moisture content in water. The value obtained in the state having an equilibrium moisture content in water is lower than the former by about 50° C. and is defined as the softening point of the developer in the present invention. The developers having a softening point of less than 20° C. as determined based on this definition often provide dispersions having insufficient long-term storage stability and it is difficult to remove giant particles present in a very small amount in the dispersion, by a wet pulverization means. For this reason, the softening point of the developer is preferably controlled to 20° C. or higher.

The following method can be adopted for controlling the softening point of the developer:

1. To elevate a softening point which is too low, a developer having a high softening point or a resinous polymer compbund having ability to increase the softing point is incorporated into a developer composition; or
2. To reduce a softening point which is too high, a developer having a low softening point or a plasticizer or further a metal salt of fatty acid is incorporated into a developer.

1. To elevate a softening point which is too low, a developer having a high softening point or a resinous polymer compound having ability to increase the softing point is incorporated into a developer composition; or
2. To reduce a softening point which is too high, a developer having a low softening point or a plasticizer or further a metal salt of fatty acid is incorporated into a developer.

The acrylamide copolymer comprising specific monomer units at a specific ratio of these repeating units as defined above is used as an aqueous solution in the present invention. The aqueous solution contains the acrylamide copolymer in the amount ranging from 0.2 to 20 parts by weight per 100 parts by weight of the developer.

Another dispersing agent is preferably simultaneously used for improving the dispersing properties of the acrylamide copolymer. Specific examples thereof are anionic surfactants represented by alkali metal salts of alkylsulfuric acid esters, alkylsufonic acids, alkylbenzenesulfonic acids, alkylnaphthalenesulfonic acid, N-methyltaurineoleic acid amide, dialkyl sulfosuccinates, sulfuric acid esters of alkylphenol-ethylene oxide adducts, high molecular weight anionic compounds represented by alkali metal salts of gum arabic, alginic acid, carboxymethyl cellulose, phosphated starches, lignin sulfonic acid, acrylic acid polymers, acrylic acid copolymers, vinylbenzenesulfonic acid polymers, vinylbenzenesulfonic acid copolymers or maleic anhydride copolymers, and water-soluble polymeric compounds such as polyvinyl alcohol, methyl cellulose or hydroxyethyl cellulose.

The size of the developer particles in the dispersion is determined by the emulsifying and dispersing process and thus the process is very important. In the emulsifying and dispersing process, a solution of the developer in an organic solvent is added to an aqueous solution containing an acrylamide copolymer and the resulting mixture is dispersed by a dispersion means such as ultrasonic dispersion mixer, a homogenizer or a homomixer to thus control the particle size to a desired value. In the dispersion, the disperse phase is the developer dissolved in the organic solvent and the continuous phase, i.e. disperse medium, comprises the aqueous solution, but according to the laboratory experiment, a water-in-oil type emulsion having reversed phase is rarely formed. Therefore, the dispersion operation should be performed with sufficient care. To prevent the reverse of phases, the pH of the dispersion system is preferably controlled to a higher alkaline level by the addition of, preferably an alkali hydroxide or alkali carbonate.

The size of the dispersed particles can be controlled by a variety of factors. Examples of such factors are 1. the kinds of dispersing means; 2. strength of the dispersing means (energy, rotational speed and the like thereof); 3. relative ratio of the disperse phase to the continuous phase; 4. viscosity of the disperse phase; 5. viscosity of the continuous phase; 6. temperature; and 7. the kind and the amount of a dispersant used. Thus, the emulsified dispersion is prepared so that the average particle size of the disperse phase determined after the removal of the organic solvent used preferably ranges from 0.3 to 5 $\mu$ and more preferably 0.5 to 3 $\mu$.

Then the emulsified dispersion is transferred to an apparatus capable of removing the organic solvent by distillation. Most of organic solvent can form an azeotropic mixture with water and, therefore, they can be almost completely removed by azeotropically distilling the organic solvent together with water. The distillation apparatus is preferably equipped with a device capable of gently stirring to make the boiling of the dispersion smooth and to thus improve the efficiency of removing the organic solvent. More specifically, if the dispersion is vigorously stirred, it is liable to form aggregates of the developer and severe foaming makes the operations difficult. The most important aspect of the present invention is to use specific acrylamide copolymers as one of dispersants for suppressing the formation of aggregates of the developer as low as possible and for preventing the interruption of the operations due to foaming. In this case, if it is intended to rapidly complete the distillation process using a large scale distillation apparatus, foaming is sometimes observed at the end of the distillation. At this stage, an anti-foaming agent may be used so far as it does not adversely effect the developer, but it is not necessary in the usual operation.

The amount of the disperse phase in the dispersion of the developer from which the organic solvent has been removed ranges from 20 to 55% by weight on the basis of the total weight of the dispersion. The particle size thereof is approximately in Gaussian distribution and the rate of the particles which are outside the Gaussian distribution is not more than 0.2% in most of the cases. These particles are a kind of aggregate and the presence thereof sometimes limits the application thereof even though the rate is very small. Thus, these particles are preferably removed by screening or hydraulic classification.

Alternatively, these aggregates or coarse particles can effectively be converted into fine particles by the wet pulverization treatment of the dispersion and hence the liquid dispersion is preferably subjected to such a treatment. It is sufficient to achieve the reduction rate of the average particle size of the developer in the order of about 10% or less by this treatment. This is because, if the reduction rate is more than 10%, the liquid dispersion sometimes shows thixotropic properties and correspondingly the handling properties thereof are impaired. Moreover, it is found out that a developing sheet, in other word, pressure-sensitive recording paper in which such a wet-pulverized liquid dispersion of the developer is employed is improved, in particular, in printability and excellent in the initial developability (property which provides high developing density immediately after writing) as well as fastness to light (property which does not decrease developing density even if the developed image is exposed to light).

Examples of the wet-pulverization apparatuses used herein are a variety of sand mill type pulverizers in which a pulverization medium is used such as ball mill, pebble mill, sand mill (horizontal or vertical sand mill), cobol mill or attritor; and high-speed grainding apparatuses such as triple roll mill, high-speed impeller dispersion machine, high-speed stone mill or high-speed impact mill. Among these, preferred are sand mill type pulverizers and high-speed impeller dispersion machine and most preferably sand mill pulverizers, for example sand grinder, are used in the invention in the light of the easiness of the establishment of the processing conditions and high pulverization efficiency.

This wet-pulverization treatment is preferably carried out at a temperature of the aqueous dispersion in the order of not more than 30° C.

A coating solution for forming a developer layer can be prepared by adding, to the aqueous developer dispersion prepared according to the method of this invention, an adhesive such as a starch, casein, gum arabic, carboxymethyl cellulose, polyvinyl alcohol, styrene·butadiene copolymer latexes or vinyl acetate latexes; an inorganic pigment such as zinc oxide, magnesium oxide, titanium oxide, aluminum hydroxide, calcium carbonate, magnesium sulfate or calcium sulfate; and/or other additives.

Further, the developer coating composition thus prepared is applied onto a substrate such as wood-free paper, coated paper, synthetic paper and films using the usual coating devices such as an air knife coater, a blade coater, a roll coater, a size press coater, a curtain coater or a short dwell-time coater to thus give developing paper for pressure-sensitive recording.

EXAMPLE

The present invention will hereinafter be explained in more detail with reference to the following non-limitative working Examples and the practical effect attained by the present invention will also be discussed in comparison with Comparative Examples. In the following Preparation Examples, Examples and Comparative Examples, the terms "part" and "%" denote "% by weight" and "part by weight" respectively unless otherwise specified.

PREPARATION EXAMPLE 1

Preparation of Aqueous Solution of Acrylamide

To a four-necked 10,000 ml volume flask of hard glass equipped with a stirring machine, a thermometer, a dropping funnel and a reflux condenser, there were added 1,500 g of acrylamide, 300 g of butyl acrylate (molar ratio of acrylamide to butyl acrylate being about 90:10), 3,800 g of water and 1,400 g of isopropanol. The contents of the flask were uniformly dissolved by slowly operating the stirring machine. The resulting solution was heated and 4 g of a 2% isopropanol solution of azobisisobutyronitrile was dropwise added, through a dropping funnel, to the solution immediately after the solution started boiling. Immediately thereafter, the polymerization reaction was initiated and the reaction solution vigorously boiled due to the heat generated. Then 4 g of the same solution was dropwise added, through a drop funnel, to the reaction solution every one hour over four times. 3 Hours after the final addition of the solution, the conversion of the polymerization reaction exceeded 99%. At this stage, the reflux condenser was replaced with an apparatus capable of removing the isopropanol and about 1,000 g of a distillate mainly comprising isopropanol was removed. 1,500 g of water was added to the distillation residue and 1,000 g of a distillate mainly comprising isopropanol was again removed. Water added to the flask so that the total amount of the contents of the flask was 7,200 g, followed by cooling. The resulting aqueous solution comprised 25% non-volatile components and had a viscosity (determined at 25° C.) of about 700 cps and an average degree of polymerization ranging from 250 to 500.

PREPARATION EXAMPLE 2

To the same flask used in Preparation Example 1, there were added 1,375 g of acrylamide, 425 g of ethyl acrylate (molar ratio of acrylamide to ethyl acrylate being about 82:18), 4,000 g of water and 1,200 g of isopropanol. Thereafter, the same procedures used in Preparation Example 1 were repeated to give a viscous aqueous solution. The resulting aqueous solution comprised 25% non-volatile components and had a viscosity (determined at 25° C.) of about 900 cps and an average degree of polymerization ranging from 300 to 600.

PREPARATION EXAMPLE 3

To the same flask used in Preparation Example 1, there were added 1,420 g of acrylamide, 259 g of ethyl acrylate, 121 g of butyl acrylate (molar ratio: acrylamide/ethyl acrylate/butyl acrylate being about 85:11:4), 3,900 g of water and 1,300 g of isopropanol. Thereafter, the same procedures used in Preparation Example 1 were repeated to give a viscous aqueous solution. The resulting aqueous solution comprised 25% non-volatile components and had a viscosity (determined at 25° C.) of about 800 cps and an average degree of polymerization ranging from 250 to 600.

PREPARATION EXAMPLE 4

To the same flask used in Preparation Example 1, there were added 1,426 g of acrylamide, 331 g of ethyl acrylate, 43 g of 2-ethylhexyl acrylate (molar ratio: acrylamide/ethyl acrylate/2-ethylhexyl acrylate being about 85 : 14 : 1), 3,800 g of water and 1,400 g of isopropanol. Thereafter, the same procedures used in Preparation Example 1 were repeated to give a viscous aqueous solution. The resulting aqueous solution comprised 25% non-volatile components and had a viscosity (determined at 25° C.) of about 700 cps and an average degree of polymerization ranging from 250 to 500.

Preparation of Aqueous Developer Dispersion

EXAMPLE 1

500 g of zinc 3,5-di-(α-methylbenzyl)salicylate (softening point 72° C.) was mixed with and dissolved in 400 g of toluene to form a toluene solution. Separately, there were added, to a 3,000 ml volume beaker of stainless steel, 80 g of the aqueous acrylamide copolymer solution obtained in Preparation Example 1, 1.0 g of sodium carbonate and 760 g of water and the foregoing toluene solution was added to the beaker after uniformly mixing these components. The mixture was emulsified and dispersed at 45° C. for 15 minutes and at 11,000 rpm with T.K. Homomixer Model M (available from Nippon Tokushu Kika Kogyo K.K.). The emulsified liquid dispersion was transferred to a three-necked 5,000 ml volume flask of hard glass equipped with a stirring machine which was provided with a stirring blade of Teflon having a width of 8 cm, a thermometer and a distillation port, 300 g of water was further added thereto and the bottom of the flask was heated while operating the stirring machine at 120 rpm. The toluene was azeotropically distilled off together with water through the distillation port. The heating was controlled so that the distillation of the toluene was completed in about 2 hours and the distillation was continued for additional 3 hours to thus remove 800 g of distillate in all. After cooling the flask, the contents were filtered through a sieve having a pore size of 20 μ. The residue remaining on the sieve was weighed to be 0.3 g (on dry basis). The content of non-volatile components in the filtrate (the liquid developer dispersion) was 41.8% and the developer particles dispersed therein had an average particle size of 0.98 μ and were in the form of true spheres.

EXAMPLE 2

The same procedures used in Example 1 were repeated except that the aqueous acrylamide copolymer solution obtained in Preparation Example 2 was substituted for the aqueous acrylamide copolymer solution obtained in Preparation Example 1 to give a liquid developer dispersion having a content of non-volatile component in the order of 42.1%. In this case, the residue remaining on a sieve was weighed to be 0.7 g (on dry basis) and the developer particles dispersed therein had an average particle size of 1.03 μ and were in the form of true spheres.

EXAMPLE 3

The same procedures used in Example 1 were repeated except that the aqueous acrylamide copolymer solution obtained in Preparation Example 3 was substituted for the aqueous acrylamide copolymer solution obtained in Preparation Example 1 to give a liquid developer dispersion having a content of non-volatile component in the order of 41.7%. In this case, the residue remaining on a sieve was weighed to be 0.4 g (on dry basis) and the developer particles dispersed therein had an average particle size of 0.97 μ and were in the form of true spheres.

EXAMPLE 4

The same procedures used in Example 1 were repeated except that the aqueous acrylamide copolymer solution obtained in Preparation Example 4 was substituted for the aqueous acrylamide copolymer solution obtained in Preparation Example 1 to give a liquid developer dispersion having a content of non-volatile component in the order of 40.2%. In this case, the residue remaining on a sieve was weighed to be 0.6 g (on dry basis) and the developer particles dispersed therein had an average particle size of 1.01 μ and were in the form of true spheres.

EXAMPLE 5

350 g of the liquid developer dispersion obtained in Examples 1 which was not yet sieved to remove coarse particles and 500 g of glass beads having a diameter of 1.5 mm were added to a 1,000 ml volume pot of sand mill (Sandgrinder® Model TSG 4H; available from Igarashi Machinery Co., Ltd.) and were wet-pulverized at 1,800 rpm at 18° C. for 5 minutes. After removing the glass beads, the average particle size of the developer particles in the resulting dispersion was 0.95 μ. In this case, the amount of residues remaining on the sieve having a pore size of 20 μ was 0 g.

EXAMPLE 6

350 g of the liquid developer dispersion obtained in Examples 2 which was not yet sieved to remove coarse particles was treated in the same manner used in Example 5 to give a liquid developer dispersion having an average particle size of the developer particles dispersed therein in the order of 1.02 μ. In this case, the amount of residues remaining on the sieve having a pore size of 20 μ was 0 g.

EXAMPLE 7

350 g of the liquid developer dispersion obtained in Examples 3 which was not yet sieved to remove coarse particles was treated in the same manner used in Example 5 to give a liquid developer dispersion having an average particle size of the developer particles dispersed therein in the order of 0.94 μ. In this case, the amount of residues remaining on the sieve having a pore size of 20 μ was 0 g.

EXAMPLE 8

350 g of the liquid developer dispersion obtained in Examples 4 which was not yet sieved to remove coarse particles was treated in the same manner used in Example 5 to give a liquid developer dispersion having an average particle size of the developer particles dispersed therein in the order of 0.98 μ. In this case, the amount of residues remaining on the sieve having a pore size of 20 μ was 0 g.

EXAMPLE 9

425 g of zinc 3,5-di-(α-methylbenzyl)salicylate and 75 of an α-methylstyrene/styrene copolymer (copolymerization ratio=45:55 (mole %); average molecular weight=about 1,600) were mixed with and dissolved in 400 g of methyl isobutyl ketone to form a methyl isobutyl ketone solution. Separately, there were added, to a 3,000 volume beaker of stainless steel, 30 g of the aqueous acrylamide copolymer solution obtained in Preparation Example 1, 200 g of a 5% aqueous solution of polyvinyl alcohol having a degree of saponification of 98% and a degree of polymerization of 1,700, 0.5 g of sodium laurylsulfate, 1.0 g of sodium carbonate and 600 g of water and the foregoing methyl isobutyl ketone solution was added to the beaker after uniformly mixing these components. The mixture was emulsified and dispersed at 45° C. for 15 minutes and at 9,000 rpm with T.K. Homomixer Model M (available from Nippon Tokushu Kika Kogyo K.K.). The emulsified liquid dispersion was transferred to a three-necked 5,000 ml volume flask of hard glass equipped with a stirring machine which was provided with a stirring blade of Teflon having a width of 8 cm, a thermometer and a distillation port, 450 g of water was further added thereto and the bottom of the flask was heated while operating the stirring machine at 120 rpm. The methyl isobutyl ketone was azeotropically distilled off together with water through the distillation port. The heating was controlled so that the distillation of the methyl isobutyl ketone was completed in about 3 hours and the distillation was continued for additional 3 hours to thus remove 900 g of distillate in all. After cooling the flask, the contents were filtered through a sieve having a pore size of 20 μ. The residue remaining on the sieve was weighed to be 0.8 g (on dry basis). The content of non-volatile components in the filtrate (the liquid developer dispersion) was 39.6% and the developer particles dispersed therein had an average particle size of 1.13 μ and were in the form of true spheres. In addition, the softening point of the disperse phase was 75° C.

EXAMPLE 10

350 g of the liquid developer dispersion obtained in Examples 9 which was not yet sieved to remove coarse particles was treated in the same manner used in Example 5 to give a liquid developer dispersion having an average particle size of the developer particles dispersed therein in the order of 1.09 μ. In this case, the amount of residues remaining on the sieve having a pore size of 20 μ was 0 g.

EXAMPLE 11

495 g of zinc 3-isododecylsalicylate (softening point 43° C.) and 5 g of zinc salt of 2,6-di-tert-butyl-4-carboxyethylphenol (as an antioxidant) were mixed with and dissolved in 400 g of toluene at 50° C. to thus give a toluene solution. The toluene solution was treated according to the same manner used in Example 1 to obtain a liquid developer dispersion having a content of non-volatile components in the order of 42.1%. The residue remaining on a sieve was weighed to be 0.2 g (on dry basis). The developer particles dispersed therein had an average particle size of 0.92°.

EXAMPLE 12

350 g of the liquid developer dispersion obtained in Examples 11 which was not yet sieved to remove coarse particles was treated in the same manner used in Example 5 to give a liquid developer dispersion having an average particle size of the developer particles dispersed therein in the order of 0.90 μ. In this case, the amount of residues remaining on the sieve having a pore size of 20 μ was 0 g.

EXAMPLE 13

The same procedures used in Example 11 were repeated except that 200 g of zinc 3-isododecylsalicylate and 295 g of zinc 3,5-di-(α-methylbenzyl)salicylate (softening point 72° C.) were substituted for 495 g of the zinc 3-isododecylsalicylate (softening point 43° C. ) used in Example 11 to thus give a liquid developer dispersion having an average particle size of the developer particles dispersed therein was 0.98 μ.

EXAMPLE 14

350 g of the liquid developer dispersion obtained in Example 13 which had not yet sieved to remove coarse particles was treated in the same manner used in Example 5 to give a liquid developer dispersion having an average particle size of the developer dispersed therein was 0.93 μ. The dry weight of the residues remaining on a sieve having a pore size of 20 μ was determined to be 0 g.

COMPARATIVE EXAMPLE 1

The same procedures used in Example 1 were repeated using 20 g of sodium laurylsulfate and 60 g of water instead of 80 g of the aqueous acrylamide copolymer solution obtained in Preparation Example 1, but the operations could not be continued at the time when the amount of the distillate reached 420 g because of abrupt vigorous foaming. Thus, at this stage, the operations were interrupted and the contents of the flask was cooled and the dry weight of the residues remaining on a sieve having a pore size of 20 μ was determined to be 93 g. Moreover, the average particle size of the developer particles in the filtrate was 1.97 μ.

COMPARATIVE EXAMPLE 2

The same procedures used in Example 1 were repeated except that 80 g of an aqueous solution of a copolymer of acrylamide (94 mole %) and 2-ethylhexyl acrylate (6 mole %) which had been prepared in the same manner in Preparation Example 1 and which had a non-volatile content of 25%, an expected molecular weight ranging from 300 to 500 and a viscosity determined at 25° C. of 1,200 cps was substituted for 80 g of the aqueous acrylamide copolymer solution of Example 1, but the operations could not be continued as in Comparative Example 1. The dry weight of the residues remaining on a sieve having a pore size of 20 μ was determined to be 0.2 g. Moreover, the average particle size of the developer particles in the filtrate was 0.94 μ.

COMPARATIVE EXAMPLE 3

The same procedures used in Example 1 were repeated except that 80 g of an aqueous solution of a copolymer of acrylamide (98 mole %) and 2-ethylhexyl acrylate (2 mole %) which had been prepared in the same manner in Preparation Example 1 and which had a non-volatile content of 25%, an expected molecular weight ranging from 250 to 400 and a viscosity determined at 25° C. of 800 cps was substituted for 80 g of the aqueous acrylamide copolymer solution of Example 1 to give a liquid developer dispersion having a non-volatile content of 37.2%. The dry weight of the residues remaining on a sieve having a pore size of 20 μ was determined to be 76 g. Moreover, the average particle size of the developer particles in the filtrate was 1.39 μ.

COMPARATIVE EXAMPLE 4

2,000 g of Zinc 3,5-di(α-methylbenzyl)salicylate (softening point 72° C.) and 1,000 g of toluene were mixed and dissolved at 60° C. to prepare a toluene solution. Separately, 10 g of sodium laurylsulfate and 5,000 g of water containing 20 g of a copolymer of acrylamide (93% by mol) with 2-phenoxy-ethyl acrylate (7% by mol) having an average molecular weight of about 2,500 were placed in a 10,000 ml capacity stainless steel beaker and heated to 60° C. While this mixture was agitated at 8,000 r.p.m. by means of a homomixer (manufactured by Nippon Tokushu Kika Kogyo Kabushiki Kaisha, 200 watt), the toluene solution prepared above was added thereto over about 2 minutes, followed by further agitating and dispersing the mixture for about 20 minutes, transferring the resulting dispersion into a 10,000 ml capacity, hard glass, three-neck flask equipped with a stirrer, a thermometer and a distilling port, heating the flask while slowly rotating the stirrer to distil off toluene (1,000 g) and water (1,000 g) and obtain a dispersion containing almost no toluene. In this case, the heating of the flask was limited to prevent from foaming the content of the flask and overflowing the bubble through the distilling port, and the complete distillation of the toluene took 18 hours. This dispersion was cooled to obtain an aqueous dispersion containing about 33% of the developer. The resulting dispersed particles had an average particle diameter of just one micron, but also contained coarse particles of 20 microns or larger (12 g). When the dispersion was sieved with a sieve having opening parts of 20 microns, an aqueous dispersion of the developer capable of being used as it was, was obtained.

In the case where said operation is scaled up, it is evident from the experience that the operation for removing toluene take longer time than said 18 hours.

COMPARATIVE EXAMPLE 5

100 g of Zinc 3,5-di(α-methylbenzyl)salicylate (softening point 72° C.) and 100 g of toluene were mixed and dissolved at 70° C. Separately, 300 g of water containing 6 g of polyvinyl alcohol (polymerization degree 1,700; saponification degree 98%) was placed in a 500 ml capacity stainless steel beaker, and while it was agitated by means of T.K. homomixer (trademark, manufactured by Nippon Tokushu Kika Kogyo Kabushiki Kaisha) at 3,000 r.p.m., the above-mentioned toluene solution was added thereto, followed by raising the velocity up to 10,000 r.p.m. at the time of completion of the addition, agitating the mixture for 2 minutes, transferring the resulting dispersion into a 500 ml hard glass three-neck flask equipped with a stirrer, a thermometer and a distilling port, and heating the flask while slowly rotating the stirrer to distill off toluene and water from the distilling port. After this operation was continued at 100° C. for one hour, the dispersion contained almost no toluene. When it was cooled, the resulting dispersion contained about 33% of a developer. The average particle diameter of dispersed particles was 1.0 micron. This dispersion was placed in a 500 ml graduated cylinder and allowed to stand still for 48 hours and settled particles were then examined. Almost no settled particle was observed.

The dispersion was again placed in a flask and agitated by mean of stirrer at 1,000 r.p.m. at 40° C.. After 36 hours, the content of the flask changed to lose flowability. This phenomenon is not yet understood but suggest a risk of losing stability of the dispersion at high temperature. All of the dispersions prepared in the Examples 1 to 14 do not indicate that phenomenon.

Preparation of Coating Composition of Developer and Developing Paper for Pressure-sensitive Recording

EXAMPLES 1-1 TO 14-1

A coating solution of a developer was prepared by mixing and dispersing 15 parts (expressed in the amount of the developer) of each aqueous developer dispersion obtained in Example 1 to 14 (Developing Paper in Example 1-1, the dispersion obtained in Example 1 was used, in Example 2-1, the dispersion obtained in Example 2 was used, and so forth), 75 parts of calcium carbonate, 10 parts of zinc oxide and 100 parts of water and then adding and dispersing, in the resulting mixture, 100 parts of a 10% aqueous solution Of polyvinyl alcohol (as a binder), 20 parts of a carboxyl-modified SBR latex (SN-307; solid content=50%; available from Sumitomo Norgatac Co., Ltd.) and 200 parts of water.

The resultant coating solution was applied onto the one side of base paper having a basis weight of 40 g/m$^2$ so that the basis weight of the paper increased by 5 g/m$^2$ (weighed after drying) and dried to give a developing paper for pressure-sensitive recording. Thus, the corresponding developing paper 1-1 to 14-1 were prepared. Any developing paper was not prepared from the liquid developer dispersions obtained in Comparative Examples 1 to 3 because the use thereof was not considered to be industrially acceptable.

Preparation of Coated Back Sheet

A microcapsule coating solution was prepared by dissolving Crystal Violet lactone in an alkylated naphthalene and then the resulting oily solution was formed into microcapsules. The resultant microcapsule coating solution was applied onto one side of base paper so that the basis weight of the paper increased by 4 g/m$^2$ (weighed after drying) and dried to give wood-free paper.

Preparation of Middle Sheet

The same microcapsule coating solution used for preparing the foregoing coated back sheet was applied onto the opposite side of each developing paper obtained in the foregoing Examples 1-1 to 14-1 so that the basis weight of the paper increased by 4 g/m$^2$ (weighed after drying) and dried to give middle sheet. The resulting sheets of the middle sheet were referred to as paper 1-2 to 14-2.

Test of Developing Paper

1. Test of Initial Developability

The developing paper obtained in Examples 1-1 to 14-1 and coated back sheet were allowed to stand at 0° C. for one hour, then each developing paper was put on the coated back sheet so as to face the coated sides thereof each other, the assembly was developed with a drop type color developing tester (weight: 150 g; height: 20 cm) and the color developing density was determined by Macbeth Reflection Densitometer 10 seconds and one day after applying a load.

2. Test of Fastness to Light

The developing paper was put on the coated back sheet so as to face the coated sides thereof each other, the assembly was developed under the action of a load in the order of 100 kg/cm$^2$, the color developing density ($D_0$) of the color developed image was determined by Macbeth Reflection Densitometer. Then the developed image was irradiated with ultraviolet rays at a distance of 20 cm and thereafter the color developing density ($D_1$) was again determined. The fastness to light of the developing paper was evaluated on the basis of the value obtained according to the following relation:

$$\text{Fastness to Light} = (D_1/D_0) \times 100$$

The closer the value to 100, the higher the fastness to light.

3. Test of Smudge of Printed Middle Sheet

Printing operation was performed using the middle sheet obtained in Examples 1-2 to 14-2 (on the developing layer surface) according to a wet offset printing system using Business Form Printing Press (17HB; available from Hikari Manufacturing Co., Ltd.) and 300 m of the printed middle sheet was rolled on a rolling core. The roll of the printed middle sheet was allowed to stand for 3 days at 50° C. and the extent of smudge in the region at a distance of 100 m from the core was visually evaluated according to the following evaluation criteria:

- ◎: no smudge (no color development) was observed;
- ○: the region was very slightly smudged (color developed);
- Δ: the region was smudged (color developed) to some extent;
- ×: the region was severely smudged (color developed).

4. Test Results

The results thus obtained are summarized in the following Table 1. In this Table, the developing paper of Example 1-1 and middle sheet of Example 1-2 tested are both denoted as Example 1 and so forth.

TABLE 1

| Paper tested | Initial Developability | | Fastness to Light | Contamination of printed matter |
|---|---|---|---|---|
| | After 10 sec | After 1 day | | |
| Example 1 | 0.24 | 0.68 | 80 | ○ |
| Example 2 | 0.24 | 0.68 | 81 | ○ |
| Example 3 | 0.25 | 0.70 | 81 | ○ |
| Example 4 | 0.24 | 0.70 | 80 | ○ |
| Example 5 | 0.26 | 0.71 | 79 | ◎ |
| Example 6 | 0.26 | 0.70 | 80 | ◎ |
| Example 7 | 0.27 | 0.72 | 80 | ◎ |
| Example 8 | 0.26 | 0.72 | 79 | ◎ |
| Example 9 | 0.24 | 0.67 | 80 | ○ |
| Example 10 | 0.26 | 0.68 | 79 | ◎ |
| Example 11 | 0.26 | 0.71 | 82 | ○ |
| Example 12 | 0.28 | 0.73 | 81 | ◎ |
| Example 13 | 0.25 | 0.70 | 80 | ○ |
| Example 14 | 0.27 | 0.71 | 79 | ◎ |

As has been explained above in detail, the present invention makes it possible to make the handling of the developer easier and to improve the quality of the pressure-sensitive recording paper obtained using the developer to thus enhance the commercial value thereof.

More specifically, according to the present invention, the resulting developer dispersion has good fluidability since the viscosity thereof is not more than 500 cps and hence it can easily be handled. Moreover, the dispersion never causes any increase in its viscosity and any increase in the particle size as well as the formation of aggregates (coarse particles) of developer are not observed even if it is stored at 25° C. for 200 days.

We claim:

1. A method for preparing an aqueous developer dispersion comprising the steps of dissolving, in an organic solvent, a developer which comprises a nuclear-substituted salicylic acid salt represented by the following general formula (I):

(I)

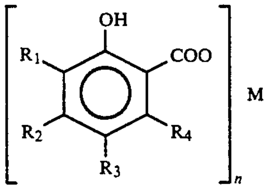

wherein $R_1$, $R_2$, $R_3$ and $R_4$ may be the same or different and each represents a hydrogen atom, a halogen atom, an alkyl group having not more than 15 carbon atoms, a cycloalkyl group, a phenyl group, a nuclear-substituted phenyl group, an aralkyl group or a nuclear-substituted aralkyl group, or two adjacent groups selected from $R_1$ to $R_4$ may be bonded together to form a ring; n is an integer of not less than 1; and M represents magnesium, calcium, zinc, aluminum, iron, cobalt, nickel or a basic ion thereof,); emulsifying and dispersing the resulting solution in aqueous solution of an acrylamide copolymer having a degree of polymerization of not less than 100 obtained by copolymerizing 96 to 70 mole % of acrylamide with 4 to 30 mole % of an alkyl or alkoxyalkyl, having not more than 4 carbon atoms, ester of acrylic acid, methacrylic acid, itaconic acid or maleic acid; and then heating the emulsified dispersion to remove the organic solvent by distillation.

2. The method for preparing an aqueous developer dispersion as set forth in claim 1 wherein the degree of polymerization of the acrylamide copolymer is not less than 200 and the copolymer is obtained by copolymerizing 92 to 75 mole % of acrylamide with 8 to 25 mole % of ethyl acrylate.

3. The method for preparing an aqueous developer dispersion as set forth in claim 1 wherein the degree of polymerization of the acrylamide copolymer is not less than 200 and the copolymer is obtained by copolymerizing 96 to 85 mole % of acrylamide with 4 to 15 mole % of butyl acrylate.

4. The method for preparing an aqueous developer dispersion as set forth in claim 1 wherein the degree of polymerization of the acrylamide copolymer is not less than 200 and the copolymer is obtained by copolymerizing 95 to 77 mole % of acrylamide, 3 to 22 mole % of ethyl acrylate and 1 to 14 mole % of butyl acrylate.

5. A method for preparing an aqueous developer dispersion comprising the steps of dissolving, in an organic solvent, a developer which comprises a nuclear-substituted salicylic acid salt represented by the following general formula (I):

(I)

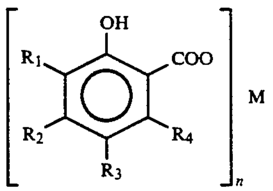

wherein $R_1$, $R_2$, $R_3$ and $R_4$ may be the same or different and each represents a hydrogen atom, a halogen atom, an alkyl group having not more than 15 carbon atoms, a cycloalkyl group, a phenyl group, a nuclear-substituted phenyl group, an aralkyl group or a nuclear-substituted aralkyl group, or two adjacent groups selected from $R_1$ to $R_4$ may be bonded together to form a ring; n is an integer of not less than 1; and M represents magnesium, calcium, zinc, aluminum, iron, cobalt, nickel or a basic ion thereof; emulsifying and dispersing the resulting solution in an aqueous solution of an acrylamide copolymer having a degree of polymerization of not less than 100 obtained by copolymerizing 96 to 70 mole % of acrylamide with 4 to 30 mole % of an alkyl or alkoxyalkyl, having not more than 4 carbon atoms, ester of acrylic acid, methacrylic acid, itaconic acid or maleic acid; then heating the emulsified dispersion to remove the organic solvent by distillation; and finely wet-pulverizing the resulting aqueous dispersion to an extent that reduction in the average particle size of the developer dispersed in the dispersion does not exceed 10%.

6. The method for preparing an aqueous developer dispersion as set forth in claim 5 wherein the degree of polymerization of the acrylamide copolymer is not less than 200 and the copolymer is obtained by copolymerizing 92 to 75 mole % of acrylamide with 8 to 25 mole % of ethyl acrylate.

7. The method for preparing an aqueous developer dispersion as set forth in claim 5 wherein the degree of polymerization of the acrylamide copolymer is not less than 200 and the copolymer is obtained by copolymerizing 96 to 85 mole % of acrylamide with 4 to 15 mole % of butyl acrylate.

8. The method for preparing an aqueous developer dispersion as set forth in claim 5 wherein the degree of polymerization of the acrylamide copolymer is not less than 200 and the copolymer is obtained by copolymerizing 95 to 77 mole % of acrylamide, 3 to 22 mole % of ethyl acrylate and 1 to 14 mole % of butyl acrylate.

9. The method for preparing an aqueous developer dispersion as set forth in claim 5 wherein the means for wet-pulverization is a sand mill.

10. The method for preparing an aqueous developer dispersion as set forth in claim 5 wherein the means for wet-pulverization is a high-speed impellar dispersion machine.

* * * * *